United States Patent
Jernström et al.

(10) Patent No.: US 11,306,003 B2
(45) Date of Patent: Apr. 19, 2022

(54) METHOD FOR THE MANUFACTURE OF HIGHLY PURIFIED 68GE MATERIAL FOR RADIOPHARMACEUTICAL PURPOSES

(71) Applicant: ITM Isotopen Technologien München AG, Garching (DE)

(72) Inventors: Jussi Jernström, Neufahrn (DE); Konstantin Zhernosekov, Munich (DE); Mark Harfensteller, Unterschleissheim (DE); Nevzat Kelmendi, Waldkraiburg (DE)

(73) Assignee: ITM Isotope Technologies Munich SE, Garching (DE)

( * ) Notice: Subject to any disclaimer, the term of this patent is extended or adjusted under 35 U.S.C. 154(b) by 877 days.

(21) Appl. No.: 16/077,892

(22) PCT Filed: Mar. 20, 2018

(86) PCT No.: PCT/EP2018/056975
§ 371 (c)(1),
(2) Date: Aug. 14, 2018

(87) PCT Pub. No.: WO2018/206188
PCT Pub. Date: Nov. 15, 2018

(65) Prior Publication Data
US 2021/0198116 A1    Jul. 1, 2021

(30) Foreign Application Priority Data

May 10, 2017   (EP) .................... 17170482

(51) Int. Cl.
| | | |
|---|---|---|
| *C01G 17/00* | (2006.01) | |
| *B01J 39/05* | (2017.01) | |
| *B01J 47/026* | (2017.01) | |
| *B01D 15/36* | (2006.01) | |
| *B01D 15/18* | (2006.01) | |
| *B01D 15/30* | (2006.01) | |
| *B01D 15/42* | (2006.01) | |
| *G21G 1/00* | (2006.01) | |

(52) U.S. Cl.
CPC ....... *C01G 17/003* (2013.01); *B01D 15/1871* (2013.01); *B01D 15/305* (2013.01); *B01D 15/362* (2013.01); *B01D 15/424* (2013.01); *B01J 39/05* (2017.01); *B01J 47/026* (2013.01); *C01P 2006/88* (2013.01); *G21G 2001/0094* (2013.01)

(58) Field of Classification Search
CPC ....... C01G 17/003; B01J 47/026; B01J 39/05; B01D 15/1871; B01D 15/305; B01D 15/362; B01D 15/424
See application file for complete search history.

(56) References Cited

FOREIGN PATENT DOCUMENTS

| CN | 101777399 | | 7/2010 |
|---|---|---|---|
| CN | 101777399 A | * | 7/2010 |
| WO | 20110033120 | | 3/2011 |

OTHER PUBLICATIONS

International Search Report & Written Opinion dated May 9, 2018 for corresponding International Application No. PCT/EP2018/056975.
Extended European Search Report dated Oct. 27, 2017 for correspondence European Application No. 17170482.8.
Schuhmacher et al. "A New 68Ge/68Ga Radioisotope Generator System for Production of 68GA in Dilute HCI." (1981) International Journal of Applied Radiation and Isotopes 32:31-36.
Fitzsimmons et al. "Production scale purification of Ge-68 and Zn-65 from irradiated gallium metal." (2015) Applied Radition and Isotopes 101:60-64.

* cited by examiner

*Primary Examiner* — Yong L Chu
(74) *Attorney, Agent, or Firm* — Lewis Kohn & Walker LLP; David M. Kohn; Kari Moyer-Henry

(57) ABSTRACT

A method for the manufacture of highly purified $^{68}$Ge material for radiopharmaceutical purposes. The invention particularly concerns the production of $^{68}$Ge-API (API=Active Pharmaceutical Ingredient) solution complying with the Guidelines for good manufacturing practices (GMP). Starting material for the method of the present invention can be a $^{68}$Ge stock solution of commercial or other origin as raw material. Such $^{68}$Ge containing raw solutions are purified from potential metal and organic impurities originating from production processes. The radiochemical method disclosed is based on a twofold separation of $^{68}$Ge from organic and metallic impurities with two different adsorbent materials. During the first separation phase $^{68}$Ge is purified from both organic and metallic impurities by adsorption in germanium tetrachloride form, after which hydrolyzed $^{68}$Ge is purified from remaining metallic impurities by cation exchange. The final $^{68}$Ge-API-product e.g. fulfills the regulatory requirements for specifications of the GMP production of $^{68}$Ge/$^{68}$Ga generators.

10 Claims, 3 Drawing Sheets

METHOD FOR THE MANUFACTURE OF HIGHLY PURIFIED 68GE MATERIAL FOR RADIOPHARMACEUTICAL PURPOSES

The present invention relates to a method for the manufacture of highly purified $^{68}$Ge material for radiopharmaceutical purposes [in the following also referred to as "$^{68}$Ge-API (Active Pharmaceutical Ingredient)"], in accordance with a method for the manufacture of highly purified $^{68}$Ge material for radiopharmaceutical purposes, characterized by (a) adjusting a $^{68}$Ge-containing solution containing organic and metallic impurities to a HCl concentration of 6.5 to 12 M in order to convert the $^{68}$Ge contained in the solution, to a $^{68}$GeCl$_4$-containing material;

(b) loading the solution comprising the $^{68}$GeCl$_4$-containing material obtained in step (a) to a resin matrix, wherein said resin matrix is a hydrophilic, macroporous, acrylic ester polymeric resin;

(c) eluting said resin matrix with water in order to hydrolyze the $^{68}$GeCl$_4$-containing material and to release $^{68}$Ge essentially in germanic acid form [$^{68}$Ge(OH)$_4$] from the $^{68}$GeCl$_4$-containing material which was adsorbed to the resin matrix in step (b);

(d) adjusting an eluate solution containing $^{68}$Ge obtained in step (c) to an HCl concentration <1M; and (e) loading said adjusted eluate solution of step (d), containing $^{68}$Ge essentially in the form of $^{68}$Ge(OH)$_4$ to a cation exchange resin, wherein metal ion impurities are essentially quantitatively retained whereas the final $^{68}$Ge-containing product being essentially free of organic and metallic impurities, elutes through.

Typically, $^{68}$Ge (half-life: 270.82 d) is generated by a p, 2n reaction in a cyclotron by irradiating naturally occurring $^{69}$Ga with high energy protons. The generated $^{68}$Ge decays by electron capture to the ß$^+$-Emitter $^{68}$Ga having a half-life of 67.63 min. $^{68}$Ga mainly disintegrates by positron emission (90.5%).

1. General Manufacture of $^{68}$Ge in the Prior Art

A description of a cyclotron production of $^{68}$Ge with a Ga$_2$O target is disclosed, e.g. in Naidoo et al., 2002. According to this document, target matrices included the following: Ga metal (natural or enriched, melting point: 29,76° C.), Ga$_2$O$_3$ (melting point: 1900° C.), Ga$_4$Ni (melting point: 900° C.) and RbBr (melting point: 682° C.). The Ga$_4$Ni and RbBr targets were avoided because, again, additional components (Ni and Rb, respectively) were added to the system. The natural Ga metal (low melting point) and the isotopically enriched Ga metal (expensive material) were not used. Ga$_2$O$_3$ prohibited the use of high particle currents. After irradiation of the target, $^{68}$Ge may be separated from the target material by various methods. Naidoo et al., 2002 report on the dissolution of a RbBr target in 6M HCl solution followed by quantitative distillation of $^{68}$Ge from 6M HCl solution. It is further reported on the distillation of $^{68}$Ge from a $^{69}$Ga target using CCl$_4$. Another method comprises the dissolution of Ga$_2$O$_3$ in 16M HNO$_3$ solution under reflux followed by ion exchange chromatography of $^{68}$Ge on a hydrous zirconium oxide medium. Also, the dissolution of Ga$_4$Ni in cold HNO$_3$ solution, followed by the recovery of $^{68}$Ge by liquid-liquid extraction in a 9M HCl—CCl$_4$ system is reported.

Furthermore, Naidoo et al., 2002 mention the dissolution of Ga$_2$O$_3$ in concentrated H$_2$SO$_4$ solution, followed by liquid-liquid extraction of $^{68}$Ge in H$_2$SO$_4$—HCl and H$_2$SO$_4$-KI systems. It is also reported on the extraction of $^{68}$Ge into CCl$_4$ from concentrated HCl solution using an α-particle irradiated Zn target. At the National Accelerator Centre (NAC) the routine production of radioisotopes is carried out by means of a high energy proton (66 MeV) beam which has high beam currents (>65 µAh) available. For large scale production, large targets (3-10 g) are normally used. At NAC an in-house Ga$_2$O target has been developed.

1.1 Radiochemical Separation of $^{68}$Ge in the Prior Art

As may be seen from Naidoo et al., 2002, different methods may be applied for radiochemical separation of $^{68}$Ge. These methods are applied in manufacturing processes of $^{68}$Ge for the separation of $^{68}$Ge from target materials, as well as in other applications where separation of $^{68}$Ge is topical, such as in production of $^{68}$Ge/$^{68}$Ga generators [Kopecký and Mudrová, 1974; Schuhmacher and Maier-Borst, 1981] or in research [Chirkst et al., 2008]. The various methods include chemical extractions [Menendez et al., 1989; Phillips, 2002; Meinken et al., 2005; Aardaneh and van der Walt, 2006], distillation [Gleason, 1960; van der Meulen et al. 2011], use of organic [Klement and Sandmann, 1955; Naidoo et al., 2002; Zhernosekov and Nikula, 2010] and inorganic materials [Bao and Song, 1996; Cheng et al., 2000], or a combination of different methods [Rouillard épouse Bauer et al., 1983; Fitzsimmons and Mausner, 2015].

1.1.1 Chemical Extraction

In the production line of Brookhaven National Laboratory (BNL), NY, USA the purification of $^{68}$Ge is performed by using chemical extractions. In this process $^{68}$Ge is extracted from gallium originating from dissolved target by several repeated extractions in the form of GeCl$_4$. In the process $^{65}$Zn is co-extracted together with some amounts of Ga. $^{68}$Ge is purified from $^{65}$Zn and remains of Ga via extracting it in tetrachloride form in organic solvent phase while the impurities are washed out in the aqueous phase. In the end of the process $^{68}$Ge is back-extracted from the organic solvent phase in diluted hydrochloric acid [Meinken et al., 2005].

As in BNL also the Los Alamos National Laboratory, NM, USA uses chemical extraction in the purification of $^{68}$Ge from target material. In their method the target is dissolved in hydrofluoric acid (HF), nitric acid (HNO$_3$) and sulphuric acid (H$_2$SO$_4$), after which $^{68}$Ge is extracted in carbon tetrachloride (CCl$_4$) and back-extracted in water [Phillips, 2002].

1.1.2 Distillation

The process of purification of $^{68}$Ge at the iThemba Labs, South Africa is described in the paper of van der Meulen et al. (2011). In this process $^{68}$Ge is volatilized and taken into a volatile activity trap consisting of sodium hydroxide and sodium sulfite (Na$_2$SO$_3$). The solution in the volatile activity trap is acidified with HF before loading the resultant solution onto a column containing anion exchange adsorbent. The anion exchange column is rinsed with dilute HF to remove any remaining impurities, such that a radiochemically pure product is obtained.

1.1.3 Column Separation

The modernized separation method at Brookhaven National Laboratory (BNL) utilizes two columns for the purification of $^{68}$Ge in the production process. In the beginning of the process $^{68}$Ge is eluted through anion exchange column in acidic conditions, after which it is retained in Sephadex G-25 column with citrate buffer in alkaline solution. The final product $^{68}$Ge is eluted from Sephadex G-25 column with diluted HCl and purified with anion exchange column (Fitzsimmons and Mausner, 2015).

1.2 Manufacturing of Detectors

Different methods have been used for the purification of germanium for the use as detector material. These methods include purification of germanium tetrachloride by solvent extraction [Morrison et al., 1954] and purification of germanium by zone refining technique [Wang et al., 2014].

1.3 Ore Processing

One method comprises of a process for recovering germanium as germanium oxide from a germaniferous metallic zinc which involves distilling the germaniferous metallic zinc under non-oxidizing conditions, recovering the distillation residue which contains the germanium, leaching the recovered distillation residue with chlorine water to convert the germanium into germanium tetrachloride, hydrolyzing the germanium tetrachloride into germanium oxide, and recovering the germanium oxide [Lebleu et al., 1978].

1.4 Other Purposes of Use

A general method for the purification of germanium is presented in the patent of Jenkner and Hans (1961) [U.S. Pat. No. 2,988,427 A]. Their invention relates to improvements in the preparation of pure elements of the fourth group of the periodical system from their hydrides.

2. Use of $^{68}Ge$

Meanwhile, there are a number of uses of $^{68}Ge$ itself, for instance, $^{68}Ge$ has been used as a positron source in positron annihilation studies in nuclear physics and metal radiography in industry. However, $^{68}Ge$ mainly is used in the field of nuclear medicine for generating $^{68}Ga$, mostly in a so called $^{68}Ge/^{68}Ga$-generator in which the $^{68}Ge$ is selectively adsorbed via specific ligands to a solid support matrix, and due to the radioactive decay of the mother nuclide $^{68}Ge$, its daughter nuclide $^{68}Ga$ is continuously generated, and it then conveniently can be eluted from the solid support matrix by means of a suitable solvent.

Such $^{68}Ge/^{68}Ga$-generators are disclosed e.g. in EP 2 216 789 A1 and in the present applicant's EP 2 439 747 B1.

In nuclear medicine, radionuclides of the positron emitter type are employed in the so-called positron emission tomography (PET). PET, being a variant of emission computed tomography, is an imaging method of nuclear medicine which produces sectional images of living organisms by visualizing the distribution of a weakly radiolabelled substance (radiopharmaceutical) in the organism to thereby image biochemical and physiological functions, and thus pertains to the diagnostic division of so-called functional imaging. In the framework of such a PET examination on a patient, the distribution of a weakly radioactive positron emitter-labelled substance within an organism is visualized by means of the radioactive decay of the positron emitter, as a general rule with the aid of several detectors.

In particular, based on the principle of scintigraphy, a radiopharmaceutical is administered intravenously to the patient at the beginning of a PET examination. PET uses radionuclides that emit positrons (ß+ radiation). Upon interaction of a positron with an electron in the patient's body, two highly energetic photons are emitted in precisely opposite directions, i.e., at a relative angle of 180 degrees. In terms of nuclear physics, this is the so-called annihilation radiation. The PET apparatus typically includes a multiplicity of detectors for detecting the photons that are annularly disposed around the patient. The principle of the PET examination consists in recording coincidences between two respective opposed detectors. The temporal and spatial distribution of these recorded decay events allows to infer the spatial distribution of the radiopharmaceutical inside the body and in particular inside the organs that are of interest for the respective examinations, and/or pathological changes such as space-occupying processes.

Finally, from the obtained data a series of sectional images is calculated, as is usual in Computer tomography.

PET is frequently employed in metabolism-related investigations in oncology, neurology, as well as cardiology, however an increasing number of additional fields of application has been surfacing in recent times.

Furthermore, $^{68}Ga$ very often is chelated with a complex molecule such as e.g. DOTA or DOTATOC (somatostatin analogues). By means of such a $^{68}Ga$-DOTATOC it is possible, for example, to detect and localize neuroendocrine tumours as well as their metastases with the aid of imaging methods such as PET.

3. Purity Requirements for $^{68}Ge$

In view of the above, it is evident that only highly pure materials, i.e. starting materials, intermediate materials as well as final products can be approved for application in a human being. In particular, extremely high purification standards must be fulfilled if radiopharmaceuticals are concerned.

Especially, the radionuclides produced have to have a high degree of purity and must be substantially free of organic and metallic impurities, for owing to competing reactions these may have an adverse effect on the labelling of the radiopharmaceuticals, and may reduce the technically achievable yield. In addition, metallic and organic impurities may interfere with the sensitive biomedical measuring systems.

As mentioned above, the $^{68}Ge$ is produced by irradiation of gallium (Ga, natural) metal or its nickel alloy targets with high energy protons in a cyclotron. Gallium target material is sealed in a niobium capsule or is plated on copper.

The irradiation is followed by isolation of $^{68}Ge$ from the bulk of target material by means of organic extraction procedure. Both the irradiation and extraction processes may contribute to the contamination of the $^{68}Ge$ solution with metallic impurities and organic residues listed in an exemplified possible impurity profile below.

2.1.1 Possible Impurity Profile

The potential impurities originating from production processes as described above, are:

Organic solvents as
  n-Heptane or
  Carbon tetrachloride ($CCl_4$)
  Sudan III
Metallic impurities from the target and target materials as
  Nickel (from a gallium nickel alloy used as target), copper (used as target backing) or
  Niobium (target encapsulation)
Iron (Fe), zinc (Zn) and lead (Pb) are monitored as general indicators for potential inorganic impurities.

Besides the chemical impurities also microbiological impurities will be present because typically no measure such as autoclaving or aseptic manufacturing, is taken to reduce the overall microbiological load.

Taking the above impurity profile of $^{68}Ge$ in consideration, it is the object of the present invention to provide a radiochemical purification method and technology for the safe and economic production of $^{68}Ge$ as active pharmaceutical ingredient ($^{68}Ge$-API) from $^{68}Ge$ stock solution of commercial or other origin as raw material.

This object is achieved by a method for the manufacture of highly purified $^{68}Ge$ material for radiopharmaceutical purposes.

In particular, the present invention relates to a method for the manufacture of highly purified $^{68}Ge$ material for radiopharmaceutical purposes, comprising (a) adjusting a $^{68}Ge$-containing solution containing organic and metallic impurities to a HCl concentration of 6.5 to 12 M in order to convert the $^{68}$Ge contained in the solution, to a $^{68}$GeCl$_4$-containing material;

(b) loading the solution comprising the $^{68}$GeCl$_4$-containing material obtained in step (a) to a resin matrix, wherein said resin matrix is a hydrophilic, macroporous, acrylic ester polymeric resin;

(c) eluting said resin matrix with an water in order to hydrolyze the $^{68}$GeCl$_4$-containing material and to release $^{68}$Ge essentially in germanic acid form [$^{68}$Ge(OH)$_4$] from the $^{68}$GeCl$_4$-containing material which was adsorbed to the resin matrix in step (b);

(d) adjusting an eluate solution containing $^{68}$Ge obtained in step (c) to an HCl concentration <1M; and (e) loading said adjusted eluate solution of step (d), containing $^{68}$Ge essentially in the form of $^{68}$Ge(OH)$_4$ to a cation exchange resin, wherein metal ion impurities are essentially quantitatively retained whereas the final $^{68}$Ge-containing product being essentially free of organic and metallic impurities, elutes through.

The purification system of the present invention was invented, developed and constructed in order to produce $^{68}$Ge solution which is purified from potential impurities originating from production processes and therefore fulfills the regulatory requirements for specifications of the production of $^{68}$Ge/$^{68}$Ge generators and showing compliance with the guidelines of good manufacturing practices (GMP) for radiopharmaceuticals.

The purified $^{68}$Ge-API solution as obtained by the method of the present invention meets these specifications, and qualifies as a GMP radiopharmaceutical.

The radiochemical method in accordance of the invention is based on a twofold separation of $^{68}$Ge from organic and metallic impurities with two different adsorbent materials. During the first separation phase $^{68}$Ge is purified from both organic and metallic impurities by adsorption in germanium tetrachloride (GeCl$_4$) form, after which hydrolyzed $^{68}$Ge is purified from remaining metallic impurities by cation exchange. The final product $^{68}$Ge-API is significantly reduced from organic and metallic impurities, and is available in well-established chemical conditions. In other words, the final product $^{68}$Ge-API is essentially free of organic and metallic impurities.

In accordance with the present invention, $^{68}$Ge solution, e.g. as obtained by ITG Isotope Technologies Garching GmbH, Garching, Germany (ITG), a daughter company of the present applicant undergoes a complete reprocessing and deep purification. In order to obtain $^{68}$Ge solution with well-defined quality, the applicant has developed a two-step radiochemical procedure for the purification and reformulation of $^{68}$Ge solutions. The method in accordance of the invention fulfills the following necessary criteria for a GMP production of $^{68}$Ge:

1) Removal of original solution and complete reformulation of $^{68}$Ge preparation;
2) Purification of $^{68}$Ge from possible metallic impurities which can be introduced into the preparation during the production process;
3) Purification of $^{68}$Ge from organic impurities which can be introduced into the preparation during the production process.

It is a preferred embodiment of the present invention that the organic impurities are selected from the group consisting of organic solvents, linear and branched $C_6$ to $C_{12}$ alkanes, in particular n-heptane; halogenated $C_1$ to $C_3$ alkanes, in particular CCl$_4$, and organic dyes, particularly sudan dyes.

These organic chemical materials are occurring in the radiochemical separation of $^{68}$Ge, and hence, can be entirely removed by the method of the present invention.

In a further preferred embodiment of the present invention, the metallic impurities are selected from the group consisting of Fe, Ni, Cu, Zn, Ga, Nb, and Pb. These metals, or their ions, respectively, are occurring in the target preparation for the irradiation procedure leading to the $^{68}$Ge, and hence, can be entirely removed by the method of the present invention.

Typically, the $^{68}$Ge-containing solution in step (a) is adjusted to an HCl concentration of 7.5 M. This high HCl concentration assures the more or less quantitative conversion of $^{68}$Ge to $^{68}$GeCl$_4$.

In order to entirely adsorb the $^{68}$GeCl$_4$ containing material to the resin matrix, it is preferred that the resin matrix of step (b) is equilibrated with the same HCl concentration to which the $^{68}$Ge-containing solution in step (a) is adjusted to.

Particularly useful for the method of the present invention is that the resin matrix of step (b) has a pore size of appr. 25 nm and/or a surface area of appr. 500 m$^2$/g.

For the purpose of present invention it is advantageous for achieving a high separation strength that the cation exchange resin in step (e) belongs to the group of strong cation exchange resins.

With the method according to the present invention a $^{68}$Ge-API can be obtained in which the final $^{68}$Ge product of step (e) exhibits at least the purification factors as shown in the following table (Metals determined with inductively coupled plasma mass spectrometry, ICP-MS):

| Metal | Purification Factor |
| --- | --- |
| Fe | 5 200 |
| Ni | 33 000 |
| Cu | 100 000 |
| Zn | 2 900 |
| Ga | 500 000 |
| Nb | 250 |
| Pb | 25 000 |

In a preferred method according to the invention, the molarity of HCl of the final $^{68}$Ge-containing product is 0.1 to 0.3 M, in particular 0.2 M.

With the present method, the yield for $^{68}$Ge is at least appr. 97%. Thus, the loss of $^{68}$Ge is extremely low and practically does not contribute significantly to the final costs of the achieved product.

Further features and advantages of the present invention will become evident from the description of an illustrative example of the present invention and the description of the drawings.

EXAMPLE I

Purification of $^{68}$Ge-solutions

In order to obtain $^{68}$Ge in controlled chemical environment free from metallic and organic impurities usable as $^{68}$Ge-API, a two-step purification procedure has been developed. The concept is based on the use of two columns with different functionalities in order to 1) adsorb and isolate $^{68}$Ge on the first column material (Column I) for the removal of original solution, metal impurities and organic impurities, 2) to elute $^{68}$Ge through the second column material (Column II) for the deep purification of remaining metal impurities by cation exchange process.

In the present example, a resin matrix which is a hydrophilic, macroporous acrylic ester polymeric resin (Pre-Filter resin, EICHROM, USA, pore size approx. 25 nm and a surface area of approx. 500 m$^2$/g and a high capacity for various organic compounds) is used as a first column material and a resin with strong cation exchange capabilities [i.e. a strong cation exchange resin] (AG® MP50 resin, Biorad, USA) is used as the second column material.

In the first part of the procedure, the acid molarity of the original $^{68}$Ge solution is adjusted to concentrated hydrochloric acid (7.5 M HCl). Under this condition tetravalent germanium is selectively adsorbed on the Column I. Application of high concentrated HCl solution further is an important factor with respect to removal of bacterial endotoxins and/or elimination of any bacterial or microbial activity. After the purification procedure $^{68}$Ge is quantitatively separated from the original solution and obtained in chemically controlled and pure solution.

Figure 1:
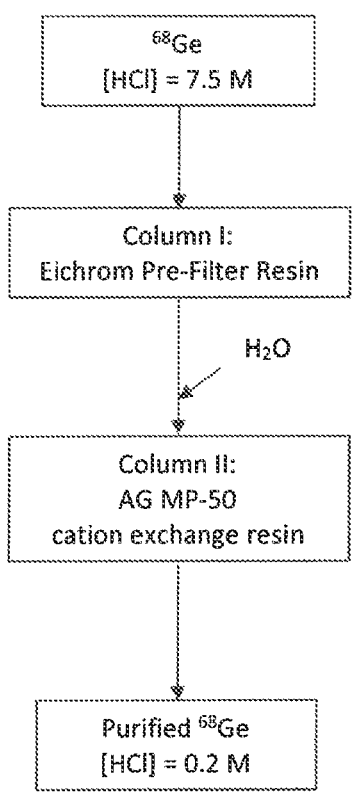
FIG. 1 is a flow chart showing $^{68}$Ge-purification process of the present invention schematically.

The general scheme of the method for the manufacture of highly purified $^{68}$Ge material for radiopharmaceutical purposes is presented in FIG. 1. As mentioned above, the first column (Column I) contains Pre-Filter resin from EICHROM, USA), which consists of an uncoated inert polymeric acrylic ester material as described above. The second column (Column II) contains a strong cation exchange resin AG®MP-50 (Biorad, USA). The purification system has been proven for the behavior of $^{68}$Ge, as well as purification factors for selected metals Fe, Ni, Cu, Zn, Ga, Nb and Pb have been determined.

The role of Column I in the method in accordance with the present invention is a selective adsorption of tetravalent $^{68}$Ge on the column resin material from the original solution adjusted to 7.5 M HCl. Without being bound to the mechanism described in the following, it appears that in high HCl concentration GeCl$_4$ is adsorbed by the used Pre-Filter resin as germanium tetrachloride (GeCl$_4$) together with organic and metallic impurities via non-polar binding. Subsequently, tetravalent germanium can be eluted with pure water or low concentrated acid, while organic and metallic impurities remain on column I.

Most of metallic cations have strong adsorption on strong cation exchange resins in dilute HCl concentrations ([HCl] <1 M), while adsorption of germanium, which is in the chemical form of germanic acid (Ge(OH)$_4$)), in these conditions is negligible. The use of the second column in the method is based on this difference in chemical properties. $^{68}$Ge being eluted from Pre-Filter resin-Column I, is further reformulated with water to an HCl concentration of 0.3 M. Under these conditions metal impurities are selectively removed by the cation exchange column (Column II) while $^{68}$Ge elutes through. With small volume of water the cation exchange column II is further rinsed in order to elute $^{68}$Ge quantitatively.

In the first column, $^{68}$Ge retains in Column I as $^{68}$GeCl$_4$. Additionally, organic and metallic impurities retain in Column I.

The $^{68}$GeCl$_4$ being adsorbed to the surface of column I is hydrolyzed and eluted as $^{68}$Ge with 1.5 mL of H$_2$O. The eluate then is diluted with 8.5 mL of H$_2$O.

Column II is rinsed with 1+1 mL H$_2$O.

Impurity metals quantitatively retain in Column II in dilute HCl, however, the desired $^{68}$Ge does not retain and elutes through as GMP grade $^{68}$Ge-API.

EXAMPLE II

Purification of 68Ge from Selected Metal Ions

Figure 2:
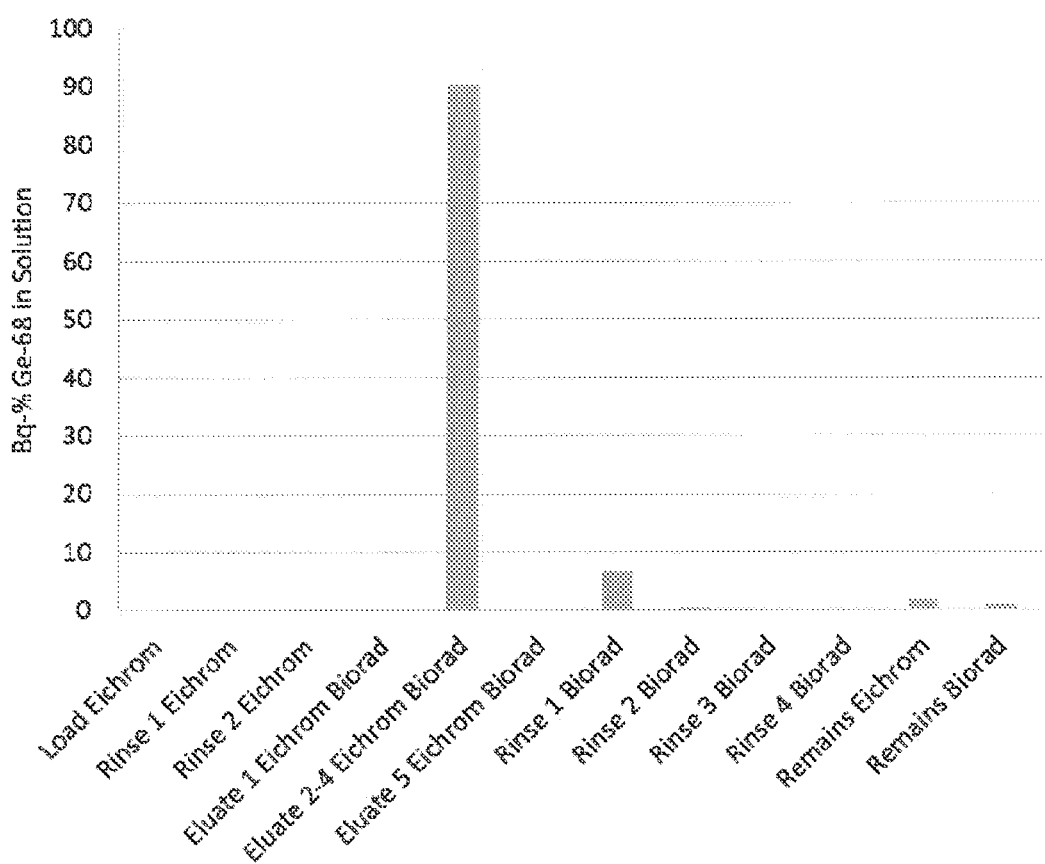
FIG. 2 is a diagram showing $^{68}$Ge activity in eluate fractions in different steps of the purification procedure.

For testing the ability of the method in accordance with the invention to remove even tiny amounts of metals, in the procedure selected metals Fe, Ni, Cu, Zn, Ga, Nb and Pb, 100 µg each, were added to a $^{68}$Ge solution (ITG), which was mixed with concentrated HCl (30%, Suprapur quality) solution so that the final HCl concentration was 7.5 M. The solution was equilibrated for minimum of 20 minutes. Column I was pre-rinsed with 5+5 mL of 7.5 M HCl for equilibration. The $^{68}$Ge solution was eluted through Column I, which was subsequently rinsed with 5+5 mL of 7.5 M HCl in order to further remove impurities. During this step also the microbiological impurities were inactivated and eluted from the column. For the hydrolysis and removal of $^{68}$Ge, Column I was first eluted with 0.5 mL of H$_2$O in order to decrease the HCl content in the column, after which $^{68}$Ge-containing fraction was eluted with 3×0.5 mL of H$_2$O. This was followed by an additional 5 mL elution with H$_2$O. The $^{68}$Ge-containing eluate fraction was diluted to 10 mL with H$_2$O in order to decrease the molarity of HCl to 0.25 M. The diluted eluate was eluted through the Column II, which had been pre-rinsed with 5+5 mL of 0.25 M HCl. After eluting the sample, the column was rinsed with 2×1 mL of H$_2$O for quantitative rinsing of $^{68}$Ge from the Column II. All the eluates were measured with HPGe gamma spectrometer. The activities and results are shown in Table 1 below and in FIG. 2.

In the quantitative analysis known amounts (100 µg) of each metal were applied in the purification system, and the eluates were measured by ICP-MS for the concentration of the selected metals, and purification factors for the metals were calculated. The results are collected in the Table 2 below.

EXAMPLE III

Selected Organic Compounds in the System

In the quantitative analysis known amounts (833 ppm) of organic compounds CCl$_4$ and n-heptane were applied in the purification system, and the end product solution was sent to a certified analysis laboratory for the determination of concentrations of CCl$_4$ and n-heptane. The concentrations were determined by gas chromatography (GC). The results are collected in Table 3 below. Neither CCl$_4$ nor n-heptane was found within their detection limits.

Furthermore, in the quantitative analysis a known amount (0.8 ppm) of organic compound Sudan III was added to $^{68}$Ge stock solution (ITG), which was applied in the purification system. The purified end product solution was analyzed by HPLC for the determination of concentration of Sudan III. The results are collected in Table 3 below.

Qualitative Analysis

In the qualitative analysis a known amount (0.8 ppm) of organic compound Sudan III was applied in the purification system. Following the purification process the end product was collected and visually analyzed. As Sudan III is a dye with red color the purification of the stained start solution can be visualized. In order to certify the visual observations photographs (not shown) were taken from the different analysis steps: start solution (a red color clearly was visible), column I for removal of organic compounds (FIG. 3), and end product (red color of the start solution no longer was seen with the bare eye).

Results
$^{68}$Ge in the Column System

From the results determined with HPGe gamma spectrometer system and collected in Table 1 it can be seen that $^{68}$Ge was eluted in 1.5 mL volume from the Pre-Filter resin column (Column I), and further eluted in diluted form and rinsed through the cation exchange column (Column II) for the final product. The yield of the separation process was 97.3% in 1.5+2 mL volume, and the molarity of HCl of the purified final product of $^{68}$Ge-API was 0.2 M.

TABLE 1

Measured $^{68}$Ge activity in eluate fractions and resins in different steps of the $^{68}$Ge purification procedure. Metals Fe, Ni, Cu, Zn, Ga, Nb and Pb were added to the solution prior to purification; 100 µg of each metal.

| Sample | Volume mL | Activity in Solution Bq | Activity in Solution % |
|---|---|---|---|
| Load/Pre-filter resin (column I) | 5 | — | — |
| Rinse 1/Pre-filter resin | 5 | — | — |
| Rinse 2/Pre-filter resin | 5 | — | — |
| Eluate 1/Pre-filter + AG MP-50 resins | 0.5 | — | — |
| Eluate 2-4/Pre-filter + AG MP-50 resins | 1.5 | 10250 | 90.3 |
| Eluate 5/Pre-filter + AG MP-50 resins | 5 | — | — |
| Rinse 1/AG MP-50 resin | 1 | 756.2 | 6.7 |
| Rinse 2/AG MP-50 resin | 1 | 34.9 | 0.3 |
| Rinse 3/AG MP-50 resin | 1 | — | — |
| Rinse 4/AG MP-50 resin | 1 | — | — |
| Remains in resin/Pre-filter resin (column I) | — | 204.7 | 1.8 |
| Remains in resin/AG MP-50 resin (column II) | — | 99.8 | 0.9 |
| Total Bq: | | 11346 | |

Purification of Selected Metals

From the results collected in Table 2 below it can be seen that purification factors for all of the selected metals were high. Nb, with oxidation state of +5, having thus differing chemical properties compared to the other selected metals, had a lower purification factor. The content of Cu in the purified eluate was lower than the limit of quantification of the ICP-MS instrument.

TABLE 2

Measured amounts and purification factors determined for selected metals in the final product after the $^{68}$Ge purification procedure. Metals were determined with ICP-MS.

| Metal | Amount Added µg | Amount Measured µg | Purification Factor |
|---|---|---|---|
| Fe | 100 | 0.019 | 5263 |
| Ni | 100 | 0.003 | 33333 |
| Cu | 100 | <0.001 | >100000 |
| Zn | 100 | 0.035 | 2857 |
| Ga | 100 | 0.0002 | 500000 |
| Nb | 100 | 0.393 | 254 |
| Pb | 100 | 0.004 | 25000 |

Purification of the Selected Organic Compounds
Quantitative Analysis

Based on the results collected in Table 3 below it can be seen that the $^{68}$Ge purification process is efficient for all of the selected three organic compounds. All determined quantities in the final product after the purification procedure were below the determination limit of the applied analysis method.

TABLE 3

Determined quantities for selected organic compounds in the final product after the $^{68}$Ge purification procedure.

| Sample Aliquot | Measured $CCl_4$ ppm | Measured n-heptane ppm | Measured Sudan III ppm |
|---|---|---|---|
| 1 | <d.l. | <d.l. | <d.l. |
| 2 | <d.l. | <d.l. | <d.l. |
| 3 | <d.l. | <d.l. | <d.l. |

Qualitative Analysis

Figure 3:
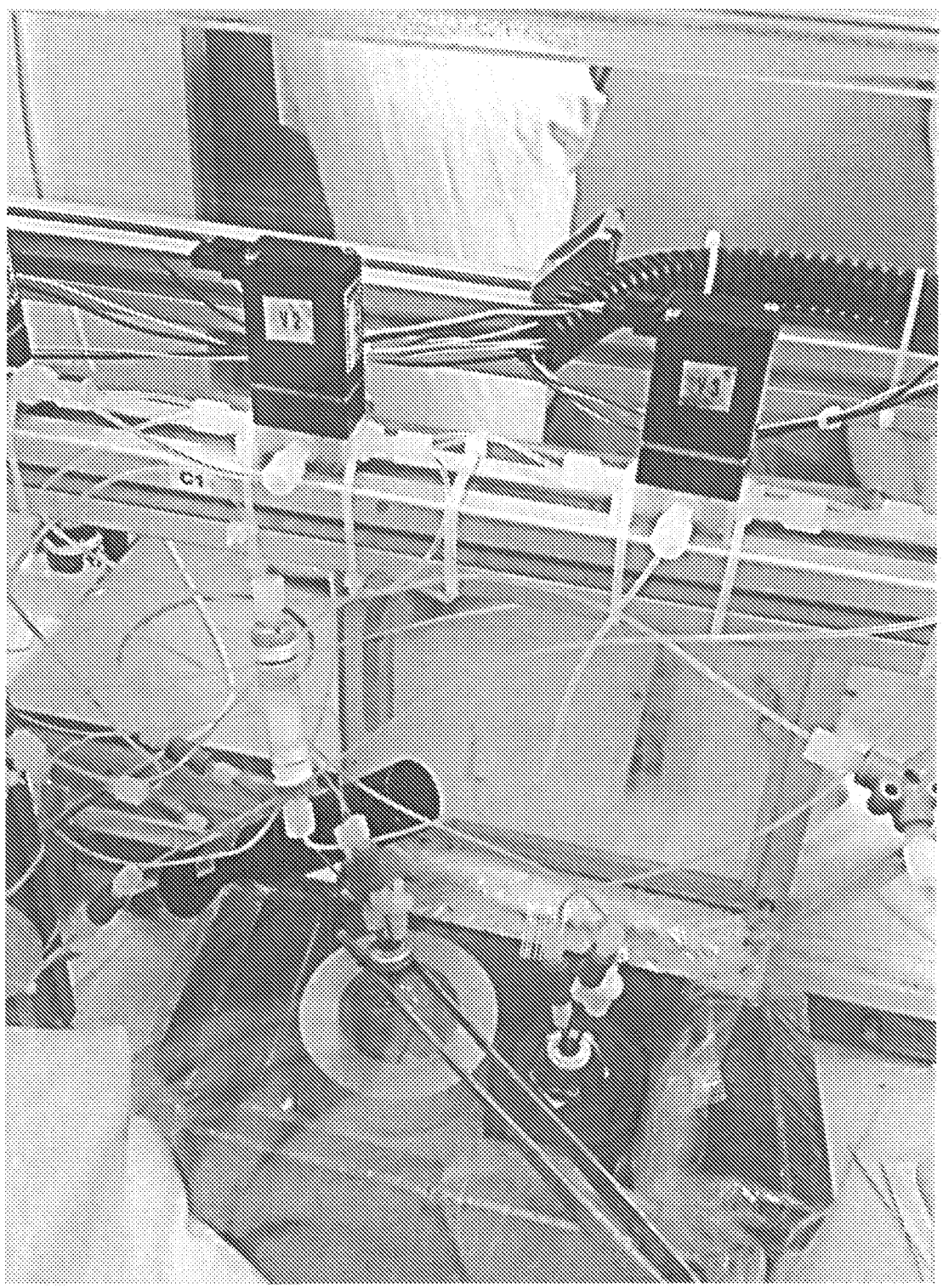
FIG. 3 shows an exemplified arrangement of a column packed with the resin matrix as a first column.

From the FIGS. 3-5 below it can be seen that the selected organic compound Sudan III is qualitatively removed by the Column I, and no remains of Sudan III can be observed in the final product.

Based on the results of the experiments it can be deduced that the developed novel radiochemical method is fully capable of purifying a $^{68}$Ge-solution from metallic and organic impurities with very high purification factors, i.e. practically quantitatively, which then qualifies as pharmaceutically acceptable $^{68}$Ge-API within the GMP-Guidelines.

LITERATURE

Aardaneh, K. and van der Walt, T. N. 2006. $Ga_2O$ for target, solvent extraction for radiochemical separation and $SnO_2$ for the preparation of a $^{68}$Ge/$^{68}$Ga generator. *Journal of Radioanalytical and Nuclear Chemistry* 268: 25-32.

Bao, B. and Song, M. 1996. A new $^{68}$Ge/$^{68}$Ga generator based on $CeO_2$. *Journal of Radioanalytical Nuclear Chemistry Letters* 213:233-238.

Cheng, W.-L., Jao, Y., Lee, C.-S. and Lo, A.-R. 2000. Preparation of $^{68}$Ge/$^{68}$Ga generator with a binary Ga/Ag electrodepositions as solid target. *Journal of Radioanalytical and Nuclear Chemistry* 245:25-30.

Chirkst, D. E., Chistyakov, A. A., Cheremisina, O. V. and Zhadovskii, I. T. 2008. Sorption of germanium from alkaline solutions on anion-exchange resin. *Russian Journal of Applied Chemistry* 81:38-41.

Fitzsimmons, J. M. and Mausner, L. 2015. Production scale purification of Ge-68 and Zn-65 from irradiated gallium metal. *Applied Radiation and Isotopes* 101:60-64.

Gleason, G. I. 1960. A positron cow. *International Journal of Applied Radiation and Isotopes* 8:90-94.

Jenkner, H. and Hans, W. S. 1961. Method for the purification of hydrides of silicon and germanium group of the periodic system. U.S. Pat. No. 2,988,427 A.

Klement, R. and Sandmann, H. 1955. Trennung des Galliums, Indiums und Germaniums von anderen Metallen durch Ionenaustauch. *Fresenius' Zeitschrift für analytische Chemie* 145: 325-334

Kopeck, P. and Mudrová, B. 1974. $^{68}$Ga-$^{68}$Ga generator for the production of $^{68}$Ga in an ionic form. *International Journal of Applied Radiation and Isotopes* 25: 263-268.

Lebleu, A., Fossi, P. and Demarthe, J.-M. 1978. Process for the recovery and purification of germanium from zinc ores. U.S. Pat. No. 4,090,871 A.

Meinken, G. E., Kurczak, S., Mausner, L. F., Kolsky, K. L. and Srivastava, S. C. 2005. Production of high specific activity $^{68}$Ge at Brookhaven National Laboratory. *Journal of Radioanalytical and Nuclear Chemistry* 263: 553-557.

Menendez, F. J. S., Menendez, F. M. S., De La Cuadra Herrera, A., Tamargo, F. A., Lorenzo, L. P., Valcarcel, M. R. and Fernandez, V. A. 1989. Process for the recovery of germanium from solutions that contain it. U.S. Pat. No. 4,886,648.

Morrison, G. H., Dorfman, E. G. and Cosgrove, J. F. 1954. Purification of germanium tetrachloride by solvent extraction. *Journal of The American Chemical Society* 76: 4236-4238.

Naidoo, C., van der Walt, T. N. and Raubenheimer, H. G. 2002. Cyclotron production of $^{68}$Ge with a Ga$_2$O target. *Journal of Radioanalytical and Nuclear Chemistry* 253: 221-225

Phillips, D. R. Radioisotope Production at Los Alamos National Laboratory. Presented in: *Specialization School on Health Physics, Universita' degli Studi di Milano*, Mar. 21, 2002.

Rouillard épouse Bauer, D., Cote, G., Fossi, P. and Marchon, B. 1983. Process for selective liquid-liquid extraction of germanium. U.S. Pat. No. 4,389,379.

Schuhmacher, J. and Maier-Borst, W. 1981. A new $^{68}$Ge/$^{68}$Ga radioisotope generator system for production of $^{68}$Ga in dilute HCl. *International Journal of Applied Radiation and Isotopes* 32:31-36.

van der Meulen, N. P., Dolley, S. G., Steyn, G. F., van der Walt, T. N., Raubenheimer, H. G. 2011. The use of selective volatization in the separation of $^{68}$Ge from irradiated Ga targets. *Applied Radiation and Isotopes* 69: 727-731.

Wang, S., Fang, H. S., Jin, Z. L., Zhao, C. J. and Zheng, L. L. 2014. Integrated analysis and design optimization of germanium purification process using zone-refining technique. *Journal of Crystal Growth* 408: 42-48.

Zhernosekov, K. and Nikula, T. 2010. Molecule for functionalizing a support, attachment of a radionuclide to the support and radionuclide generator for preparing the radionuclide, and preparation process. Patent US 2010/0202915 A1.

The invention claimed is:

1. A method for the manufacture of highly purified $^{68}$Ge material for radiopharmaceutical purposes, characterized by
    (a) adjusting a $^{68}$Ge-containing solution containing organic and metallic impurities to a HCl concentration of 6.5 to 12 M in order to convert the $^{68}$Ge contained in the solution, to a $^{68}$GeCl$_4$-containing material;
    (b) loading the solution comprising the $^{68}$GeCl$_4$-containing material obtained in step (a) to a resin matrix, wherein said resin matrix is a hydrophilic, macroporous, acrylic ester polymeric resin;
    (c) eluting said resin matrix with water in order to hydrolyze the $^{68}$GeCl$_4$-containing material and to release $^{68}$Ge essentially in germanic acid form [$^{68}$Ge(OH)$_4$] from the $^{68}$GeCl$_4$-containing material which was adsorbed to the resin matrix in step (b);
    (d) adjusting an eluate solution containing $^{68}$Ge obtained in step (c) to an HCl concentration <1M; and
    (e) loading said adjusted eluate solution of step (d), containing $^{68}$Ge essentially in the form of $^{68}$Ge(OH)$_4$ to a cation exchange resin, wherein metal ion impurities are essentially quantitatively retained whereas the final $^{68}$Ge-containing product being essentially free of organic and metallic impurities, elutes through.

2. The method according to claim 1, characterized in that the organic impurities are selected from the group consisting of organic solvents, linear and branched C$_6$ to C$_{12}$ alkanes, halogenated C$_1$ to C$_3$ alkanes, and organic dyes.

3. The method according to claim 1, characterized in that the metallic impurities are selected from the group consisting of Fe, Ni, Cu, Zn, Ga, Nb, and Pb.

4. The method according to claim 1, characterized in that the $^{68}$Ge-containing solution in step (a) is adjusted to an HCl concentration of 7.5 M.

5. The method according to claim 1, characterized in that the resin matrix of step (b) is equilibrated with the same HCl concentration to which the $^{68}$Ge-containing solution in step (a) is adjusted to.

6. The method according to claim 1, characterized in that the resin matrix of step (b) has a pore size of approximate 25 nm and/or a surface area of approximate 500 m$^2$/g.

7. The method according to claim 1, characterized in that the cation exchange resin in step (e) belongs to the group of strong cation exchange resins.

8. The method according to claim 1, characterized in that the impurities in the final $^{68}$Ge product of step (e) exhibit at least the purification factors as shown in the following table (Metals determined with inductively coupled plasma mass spectrometry, ICP-MS):

| Metal | Purification Factor |
| --- | --- |
| Fe | 5 200 |
| Ni | 33 000 |
| Cu | 100 000 |
| Zn | 2 900 |
| Ga | 500 000 |
| Nb | 250 |
| Pb | 25 000 |

9. The method according to claim 1, characterized in that the molarity of HCl of the final $^{68}$Ge-containing product is 0.1 to 0.3 M.

10. The method according to claim 1, characterized in that the yield for $^{68}$Ge is at least approximate 97%.

* * * * *